United States Patent
Reynolds et al.

(10) Patent No.: US 7,603,210 B2
(45) Date of Patent: Oct. 13, 2009

(54) APPARATUS AND METHOD OF VESSEL EMISSION MANAGEMENT

(75) Inventors: Kevin John Reynolds, Seattle, WA (US); William Lefevre Hurley, Jr., Seattle, WA (US)

(73) Assignee: The Glosten Associates, Inc., Seattle, WA (US)

( * ) Notice: Subject to any disclaimer, the term of this patent is extended or adjusted under 35 U.S.C. 154(b) by 691 days.

(21) Appl. No.: 11/042,290

(22) Filed: Jan. 24, 2005

(65) Prior Publication Data
US 2005/0165518 A1   Jul. 28, 2005

Related U.S. Application Data

(60) Provisional application No. 60/538,744, filed on Jan. 22, 2004.

(51) Int. Cl.
*B60L 3/00* (2006.01)
*G06F 9/00* (2006.01)

(52) U.S. Cl. ............... 701/21; 114/183 R; 114/125; 114/182; 440/88 N; 707/10; 702/2

(58) Field of Classification Search ............... 701/21; 114/125, 183 R, 182, 183 A, 198; 340/989; 440/88 N
See application file for complete search history.

(56) References Cited

U.S. PATENT DOCUMENTS

| | | | |
|---|---|---|---|
| 3,937,662 A * | 2/1976 | Bartik | 210/649 |
| 6,444,119 B1 * | 9/2002 | Mains, Jr. | 210/85 |
| 6,687,583 B1 | 2/2004 | Knoska | |
| 6,766,754 B1 | 7/2004 | Scott | |
| 6,773,611 B2 | 8/2004 | Perlich | |
| 6,816,088 B1 | 11/2004 | Knoska | |
| 6,823,810 B2 * | 11/2004 | Carlson et al. | 114/125 |
| 6,826,514 B1 | 11/2004 | Antico | |
| 6,840,983 B2 | 1/2005 | McNulty | |
| 6,869,540 B2 | 3/2005 | Robinson | |
| 7,059,261 B2 | 6/2006 | Randall | |

(Continued)

FOREIGN PATENT DOCUMENTS

WO   WO 2005/108301 A1   11/2005

(Continued)

OTHER PUBLICATIONS

*Assessment of Cruise Ship and Ferry Wastewater Impacts in Alaska*, Alaska Department of Environmental Conservation, Feb. 9, 2004.

(Continued)

*Primary Examiner*—Thomas G Black
*Assistant Examiner*—Lin B Olsen
(74) *Attorney, Agent, or Firm*—Christensen O'Connor Johnson Kindness PLLC

(57) ABSTRACT

An emission management system (200) for a vessel (100) adapted to travel on water. The emission management system includes a monitoring assembly (202) for monitoring an emission from the vessel. The monitoring assembly is adapted to automatically detect the emission from the vessel and generate a data set representative of a vessel location at a time the emission occurred. The emission management system also includes a data storage system (210) in communication with the monitoring assembly for recording the data set generated by the monitoring assembly.

4 Claims, 7 Drawing Sheets

U.S. PATENT DOCUMENTS

| | | |
|---|---|---|
| 7,128,009 B2 | 10/2006 | Randall |
| 7,264,738 B2 | 9/2007 | Bai |
| 7,273,562 B2 | 9/2007 | Robinson |
| 7,327,286 B2 | 2/2008 | Knoska |
| 7,374,602 B2 | 5/2008 | McNulty |
| 7,381,338 B2 | 6/2008 | van Leeuwen |
| 2001/0027070 A1* | 10/2001 | Morris et al. ............ 440/89 |
| 2002/0174814 A1 | 11/2002 | Hunter |
| 2003/0176971 A1* | 9/2003 | Daniels et al. ............ 702/2 |
| 2003/0205187 A1 | 11/2003 | Carlson et al. |
| 2005/0016933 A1 | 1/2005 | Perlich |
| 2005/0155539 A1* | 7/2005 | Randall ............ 114/125 |
| 2005/0167369 A1 | 8/2005 | Robinson |
| 2007/0006787 A1 | 1/2007 | Randall |
| 2007/0036683 A1 | 2/2007 | Hirst |
| 2007/0102371 A1 | 5/2007 | Bhalchandra |
| 2007/0261626 A1 | 11/2007 | Thompson |
| 2008/0072809 A1 | 3/2008 | Mehta |
| 2008/0147257 A1 | 6/2008 | Kuhlgatz |

FOREIGN PATENT DOCUMENTS

WO     WO 2005108301 A1 * 11/2005

OTHER PUBLICATIONS

Carlton, J.T., et al. "Shipping Study: The Role of Shipping in the Introduction of Nonindigenous Aquatic Organisms to the Coastal Waters of the United States (Other Than the Great Lakes) and an Analysis of Control Options," National Sea Grant College Program/Connecticut Sea Grant Project R/ES-6, Report No. CG-D-11-95, Apr. 1995.

"Draft International Convention for the Control and Managemet of Ships' Ballast Water and Sediments," to be submitted to the Feb. 2004 International Conference on Ballast Water Management for Ships, Annex, BWM/CONF/2, ©2002, International Maritime Organization.

"Glosten Ballast Management System: GBMS Console Manual," *Operating Instructions*, Glosten Associates, Inc., Seattle, Wash., May 12, 2004.

"Guidelines for the Development of Garbage Management Plans," MEPC/Circ. 317 Annex, Jul. 10, 1996.

"International Convention for the Prevention of Pollution From Ships, 1973, as Modified by the Protocol of 1978 Relating Thereto (MARPOL 73/78),"© 2002 International Maritime Organization, <http://www.imo.org/Conventions/contents.asp?doc_id=678&topic_id=258>.

"Navigation and Navigable Waters," Title 33, Chapter I, Part 151, Subpart A, "Implementation of MARPOL 73/78 and the Protocol on Environmental Protection to the Antartic Treaty as Its Pertains to Pollution From Ships," *Code of Federal Regulations*, revised as of Jul. 1, 2004.

"Prevention of Air Pollution From Ships", © 2002 International Maritime Organization, <http://www.imo.org/Environment/mainframe.asp?topic_id=233>.

"Prevention if Pollution by Garbage From Ships", © 2002 International Maritime Organization, <http://www.imo.org/Environment/mainframe.asp?topic_id=297>.

"Prevention of Pollution by Sewage From Ships", © 2002 International Maritime Organization, <http://www.imo.org/Environment/mainframe.asp?topic_id=237>.

Ballast Exchange, vol. 5, Spring/Summer 2003.

Ballast Water Treatment R&D Directory, 2d ed., International Maritime Organization, London, Nov. 2004.

Hay, C.H., and D. Tanis, "Mid-Ocean Ballast Water Exchange: Procedures, Effectiveness and Verification," Cawthron Report No. 468, compiled at Cawthron of Nelson, New Zealand, and Battelle of Duxbury, Mass., Dec. 1998.

Hurley, JR., W.L., and K.J. Reynolds, "Ballast Exchange Monitoring System Report," Glosten Associates, Inc., Seattle, Wash., File No. 02110, May 2003.

Raaymakers, S. (ed.), "GloBallast Monograph Series No. 5," Proceedings of 1st International Ballast Water Treatment R&D Symposium, International Maritime Organization, London, Mar. 26-27, 2001.

* cited by examiner

APPARATUS AND METHOD OF VESSEL EMISSION MANAGEMENT

CROSS-REFERENCE TO RELATED APPLICATION

This application claims the benefit of U.S. Provisional Patent Application No. 60/538,744, filed Jan. 22, 2004, entitled Ballast Management System for Vessels, the disclosure of which is hereby expressly incorporated by reference.

FIELD OF THE INVENTION

The present invention relates generally to emission management systems for water borne vessels and more specifically to emission management systems able to obtain and store emissions data relative to emissions from water borne vessels.

BACKGROUND OF THE INVENTION

Water borne vessel operation results in emissions to the environment from many different sources. For instance, a power plant of the vessel may burn a fuel source, which results in the release of contaminants to the environment through a power plant exhaust stream. Further, cooling water may be used to cool the power plant during operation, picking up thermal energy and potential inorganic or organic contaminants while being used to cool the power plant. The cooling water may then be discharged overboard resulting in a release of thermal waste and/or other contaminants to the environment. The vessel may have a ballast water system used to take on and later discharge ballast water. The discharged ballast water may or may not contain contaminants, including biological contaminants, such as non-native species and biological pathogens, which may harm the environment in which they are discharged. Further, during vessel operations, waste water, typically divided into either black water or gray water, is produced and discharged overboard with or without treatment. Other waste streams include solid waste, which in some cases is simply thrown overboard and, in other cases, is stored for later disposal ashore or waste oil, which is temporarily stored for later disposal at a shore facility. Other potential contaminant emission sources include liquid waste streams produced while pumping out various tanks, compartments, or areas of the vessel, such as a bilge of the vessel, a cargo slop tank, etc., which are then pumped overboard with or without treatment. Further contaminant emission sources include gases vented from tanks and flue gas from an incinerator.

Emissions from vessels are coming under evermore increasing scrutiny. Thus, various jurisdictions have begun implementing rules to regulate emissions from water borne vessels. Inasmuch as water borne vessels are mobile, difficulties arise in complying with the rules of the various jurisdictions in which the vessel travels. This is especially true for vessels sailing on international routes. Complying with each jurisdiction is a monumental task when one considers that the vessel, at any one time, is mandated to comply with rules promulgated by multiple levels of jurisdictions, such as international, federal, state, and local jurisdictions, which change widely as the vessel travels along its route. Thus, there exists a need for an apparatus and method for effectively managing a water borne vessel's emissions to aid a vessel in complying with vessel emission laws and regulations.

SUMMARY OF THE INVENTION

One embodiment of an emission management system formed in accordance with the present invention for a vessel adapted to travel on water is disclosed. The emission management system includes a monitoring assembly for monitoring an emission from the vessel. The monitoring assembly is adapted to automatically detect the emission from the vessel and generate a data set representative of a vessel location at a time the emission occurred. The emission management system also includes a data storage system in communication with the monitoring assembly for recording the data set generated by the monitoring assembly.

Another embodiment of an emission management system formed in accordance with the present invention for a vessel adapted to travel on water having a ballast tank for storing ballast is disclosed. The emission management system includes a flow monitoring assembly for automatically detecting a location of origin and a quantity of a segment of ballast water entering the vessel and generating data representative of the location of origin and the quantity of the segment of ballast water. The emission management system also includes a data storage system in communication with the flow monitoring assembly for storing the data generated by the flow monitoring assembly.

An alternate embodiment of an emission management system formed in accordance with the present invention for a vessel for traveling on water, the vessel adapted to take on and discharge ballast water, is disclosed. The emission management system includes a monitoring assembly for monitoring a flow of ballast water into and out of the vessel. The monitoring assembly includes an origin location sensor for determining a location of origin for a selected segment of ballast flowing into the vessel and a quantity determining system. The quantity determining system is adapted to determine a quantity of the selected segment of ballast flowing into the vessel. The monitoring assembly also includes a tracking system for tracking the selected segment of ballast within the vessel and a discharge location sensor for determining a location of discharge of the selected segment of ballast from the vessel. The monitoring assembly further includes a data storage system in communication with the monitoring assembly for storing data indicative of the location of origin, the quantity, and the location of discharge of the selected segment of ballast.

Another alternate embodiment of an emission management system formed in accordance with the present invention for managing emissions from a vessel adapted to travel on water is disclosed. The emission management system includes a user interface adapted to receive discharge location data from a user indicating a location of an actual or proposed emission and emission data describing the emission. The emission management system also includes a regulation compliance system in communication with the user interface. The regulation compliance system is adapted to receive the discharge location data from the user interface and generate regulation compliance data indicating a set of regulations of the location of emission that govern the emission. The emission management system also includes an emission management system processor in communication with the user interface and regulation compliance system. The emission management system processor is adapted to receive the discharge location data, the emission data, and the regulation compliance data and determine if the emission is in compliance with the set of regulations.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
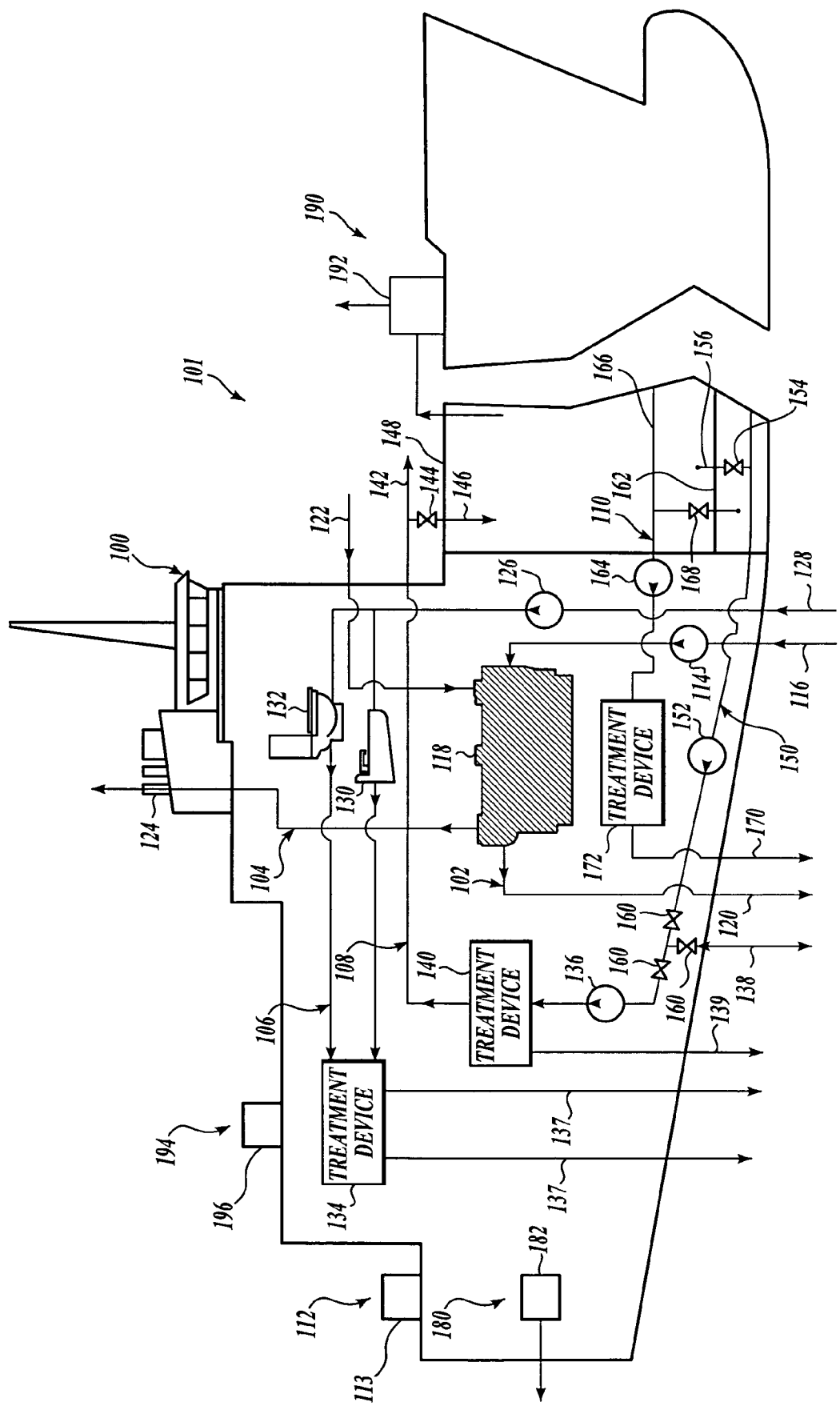
FIG. 1 is a schematic view of a water borne vessel showing the systems of the vessel which potentially are sources of emissions to the environment.

Referring to FIG. 1, a water borne vessel 100 is shown. The operation of the vessel 100 requires the installation and use of vessel systems 101 which result in emissions to the environment. These emissions may contain contaminants damaging to the environment in which they are discharged. A few suitable examples of vessel systems 101 whose operation may result in emissions are shown in FIG. 1, and may include a power plant cooling water system 102, a power plant exhaust system 104, a waste water management system 106, a ballast water system 108, a compartment liquid removal system 110, a solid waste disposal system 112, a waste oil disposal system 180, a gas treatment system 190, and an incinerator system 194.

Figure 2:
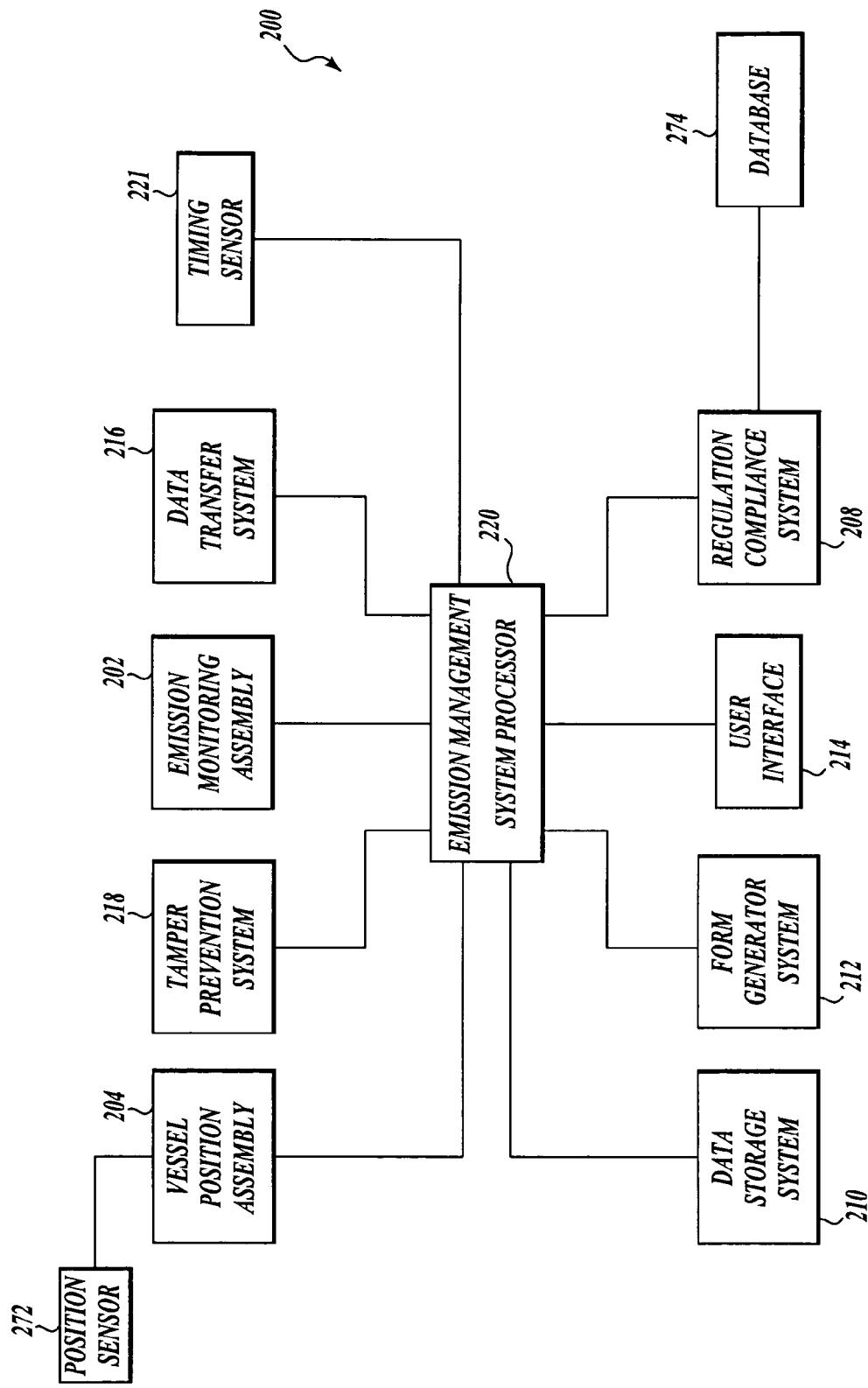
FIG. 2 is a schematic view of one embodiment of an emission management system for managing emissions from the vessel systems shown in FIG. 1.

Referring to FIG. 2, one embodiment of a vessel emission management system 200 formed in accordance with the present invention is shown. The vessel emission management system 200 is able to aid vessel and shore side personnel in operating the vessel systems 101, such as those shown in FIG. 1, in accordance with the laws and regulations promulgated by one or more jurisdictions. Generally stated, this is accomplished by monitoring the various vessel systems 101 for emissions and recording information regarding the emissions, a few suitable examples of the recorded information being the time, location, treatment parameters, quantity, contaminant concentration, and type of the emission. Of note, for the purposes of this detailed description, the term "time" refers not only to the time of day, but may include date and a duration of emission information. Likewise, quantity may include a rate of discharge, a weight or volume of emission discharged in total or per a select unit of time, etc. The vessel emission management system 200 may further aid compliance by determining the applicable laws and regulations for a current or future jurisdiction, and recommending a course of action to take for compliance, including the preparation and/or submittal of applicable reporting documents. The emission management system 200 may operate as a shore side planning tool to plan future vessel emissions or may be installed directly aboard the vessel to directly monitor emission sources in real time through a sensor assembly and/or act as an onboard planning tool.

In light of the above general description of the vessel emission management system 200 and the vessel systems it regulates, this detailed description will now focus in greater detail upon the vessel systems monitored by the vessel emission management system 200, since understanding the vessel systems monitored will bring a better understanding of the vessel emission management system 200 described in more detail thereafter.

Turning to FIG. 1, as described above, the vessel systems 101 installed and used in a typical water borne vessel include a power plant cooling water system 102, a power plant exhaust system 104, a waste water management system 106, a ballast water system 108, a compartment liquid removal system 110, a solid waste disposal system 112, a waste oil disposal system 180, a gas treatment system 190, and an incinerator system 194.

The power plant cooling water system 102 includes a pump 114 for drawing cool sea water through a cooling water inlet 116 and either directly through a power plant 118 for cooling same, or through a heat exchange to exchange heat with another fluid which passes through the power plant 118. A few suitable examples of power plants typically used on water borne vessels include internal combustion engines, steam turbines, and gas turbines. As the cooling water passes through either the power plant or the heat exchanger, the cooling water picks up waste heat and potentially other contaminants, which are inadvertently introduced into the cooling water, such as fuel, lubricating oil, exhaust gases, etc. The cooling water, contaminated with at least waste heat and potentially other contaminants, is then discharged from the vessel via a cooling water outlet 120 with or without treatment.

Focusing on the power plant exhaust system 104, combustion air is drawn through an air inlet line 122 for combustion in the power plant 118. Once combusted, the products of combustion, i.e., the exhaust stream generated by the power plant 118, is discharged from the vessel via an exhaust gas stack 124 with or without treatment. A few examples of contaminants which the exhaust stream may contain includes aldehydes, acetic acids, nitric oxides, sulfur oxides, ozone, and Volatile Organic Compounds (VOCs), to name a few.

The waste water management system 106 includes a pump 126 for drawing water from under the vessel through an inlet line 128, or alternately from a fresh water tank filled when the vessel is dockside or which is filled by an onboard distillation plant (not shown). The fresh water is then used by gray water generating devices 130, a few suitable examples being dishwashers, showers, sinks, and laundry machines, or black water generating devices 132, such as toilets. The outlets from the gray and black water generating devices 130 and 132 may or may not be coupled to a treatment device 134 for performing full or partial treatment of these waste streams prior to discharge overboard via outlet(s) 137. Alternately, the outlets from the gray and/or black water generating devices 130 and 132 are directed to a holding tank (not shown) for later discharge ashore or overboard in a jurisdiction allowing such discharges.

The ballast water system 108 includes a pump 136 for drawing ballast water from below the vessel through an inlet line 138. As is well known in the art, the ballast water may also be transferred into the vessel, out of the vessel, or between tanks of the vessel via gravity with or without assistance from the pump 136. In a few ships, the ballast water may then be processed by a treatment system 140 to sanitize the ballast water, i.e., to kill any organisms present in the ballast water, to impede the transfer of non-indigenous organisms and harmful pathogens to new environments. Although the treatment system 140 is shown and described as treating inlet ballast water, it should be apparent that the treatment system 140 may be able to treat the ballast water at alternate points in the process, such as just prior to discharge or once the ballast water is in the tank. Once treated by the treatment system 140, the ballast water is then directed into various tanks for ballasting the vessel through a ballast transfer piping system 142. The ballast transfer piping system 142 includes a series of valves 144 (one shown) and drops 146 (one shown) for selectively directing the ballast water into one or more ballast tanks 148, such as double bottom tanks, wing tanks, heeling tanks, side tanks, topside tanks, fore peak tanks, aft peak tanks, trimming tanks, deep tanks, deck tanks, cargo holds, segregated ballast tanks, dedicated ballast tanks, etc. The ballast water system 108 may also be used to transfer ballast between two or more tanks as described in more detail below.

The ballast water system 108 further includes a ballast transfer system 150. The ballast transfer system 150 is used in the removal of ballast from a ballast tank 148. The ballast transfer system 150 includes a pump 152, a series of valves 154 (one shown), and risers 156 (one shown) for selectively directing the ballast water out of one or more ballast tanks 148 to be discharged overboard though the intake/discharge line 138. As is well known in the art, the ballast water may also be transferred out of the vessel or between tanks of the vessel via gravity with or without assistance from the pump 152. Further, it should be apparent to those skilled in the art that although a separate pump is shown and described for use with the ballast transfer system 150, the ballast transfer system 150 may be alternately arranged to use the same pump used in the ballast water system 108.

When transfer of the ballast to another tank is desired in lieu of discharging the ballast water, an array of valves 160 may be manipulated to direct the ballast water into the ballast transfer piping system 142 for transfer to one or more ballast tanks 148. Or, when treatment of the ballast water is needed, the array of valves may be manipulated to direct the ballast water to the treatment device 140 prior to discharge overboard via discharge line 139 or discharged into a selected ballast tank 148.

The compartment liquid removal system 110 is used to remove liquid from various areas or compartments 162 located throughout the vessel 100. A few suitable examples of suitable areas or compartments 162 include a bilge area of the vessel, holding tanks, and the bottom of cargo holds. The compartment liquid removal system 110 includes a pump 164 coupled to a removal piping system 166 having various valves 168 for selectively drawing liquids from the compartments 162 for discharge through a discharge line 170. The liquids discharged may or may not be treated by a treatment system 172 prior to discharge.

The solid waste disposal system 112 is typically simplistic in nature and involves storage of solid waste for later disposal ashore in a storage container 113, or the throwing overboard of the solid waste by manual means when the vessel 100 is more than a regulation specified distance from shore. Typically, the solid waste is separated into solid waste that will float, solid waste that will sink, and solid waste that is plastic based, and disposed of in accordance with the regulations governing these solid waste types. The waste oil disposal system 180 is also simplistic in nature and involves storage of waste oil in a storage container 182 for later disposal ashore or incineration.

During operation of the vessel, gases potentially containing contaminants may accumulate in various compartments and/or tanks in the vessel. This is especially true in vessels carrying liquid bulk cargo, such as a chemical or oil tanker. Some vessels employ gas treatment systems 190 for treating gas discharged or vented from these tanks. For instance, as a tank 148 of an oil tanker is filled with ballast or oil, the gases contained in the tank must be vented as the tank 148 is filled. The vent gas is either discharged to the environment or alternately, treated via a gas treatment device 192 prior to discharge to the atmosphere to remove contaminants, such as Volatile Organic Compounds (VOCs) and hydrogen sulfide depending upon the regulations in effect in the applicable jurisdictions.

Vessels may also include an incinerator system 194 for disposing of waste products. An incinerator 196 of the incinerator system 194 is used to incinerate waste products generated during operation of the vessel, such as waste liquids and solids, typically of a hazardous nature. As is well known, the incinerator 196 burns the waste products at high temperatures to thermally break down the waste products to non-combustible ash and air emissions. The air emissions from the incinerator 196 may or may not be treated to reduce the concentration of contaminants in the air emissions. The ash from the incinerator is typically stored and transferred ashore for proper disposal.

In light of the above description of the various vessel systems 101 employed aboard the vessel 100 during operation, the emission management system used to monitor emissions from the vessel 100 will now be described in further detail. Referring to FIG. 2, the emission management system 200 includes an emission monitoring assembly 202, a vessel position assembly 204, a regulation compliance system 208, a data storage system 210, a form generator system 212, a user interface 214, a data transfer system 216, a tamper prevention system 218, an emission management system processor 220, and a timing sensor 221.

Referring to FIGS. 1 and 2, the emission monitoring assembly 202 is able to monitor/detect emissions from the vessel 100. Preferably, the emission monitoring assembly 202 is able to monitor all emissions from the vessel to aid in determining their compliance with applicable laws and regulations and/or to aid in determining the impact the vessel operation has upon the environment. In the illustrated embodiment, the emission monitoring assembly 202 is able to track discharges from one or more of the vessel systems 101, such as the vessel's power plant cooling water system 102, the power plant exhaust system 104, the waste water management system 106, the ballast water system 108, the compartment liquid removal system 110, the solid waste disposal system 112, the waste oil disposal system 180, the gas treatment system 190, and the incinerator system 194.

Figure 3:
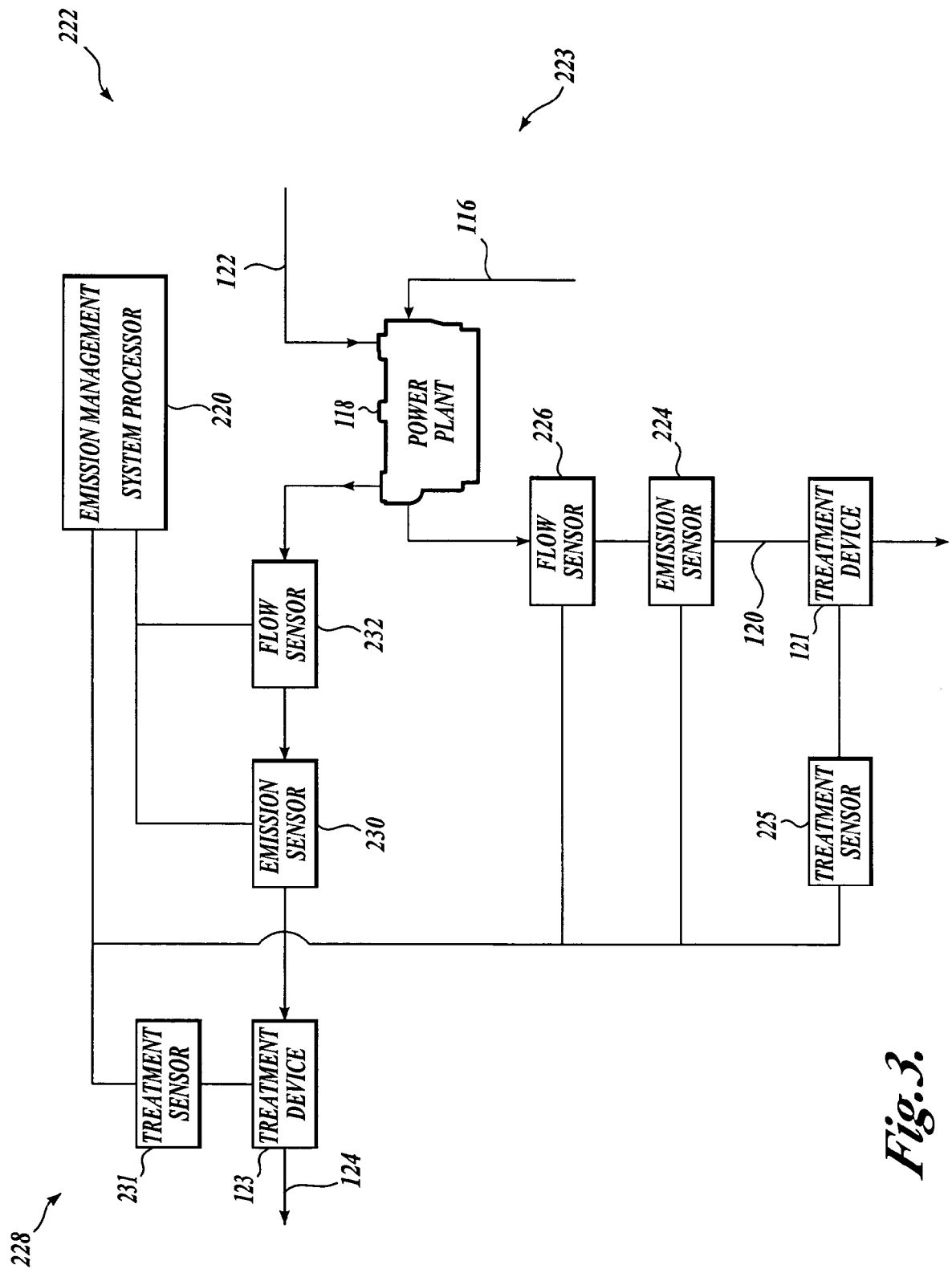
FIG. 3 is a schematic view of a portion of the emission monitoring assembly of FIG. 2 used to monitor emissions from the vessel's power plant.

Referring to FIG. 3, the emission monitoring assembly 202 (see FIG. 2) includes a power plant monitoring system 222, which includes two subsystems, a cooling water monitoring system 223 and an exhaust gas monitoring system 228. The power plant monitoring system 222 includes a cooling water discharge emission sensor 224. The cooling water discharge emission sensor 224 is able to detect a quantity and/or concentration of pollutants passing through the cooling water outlet 120. For instance, the cooling water discharge emission sensor 224 may be able to detect a concentration of potential contaminants in the cooling water, such as the presence of hydrocarbons from engine fuel or lubricating oils, traces of exhaust gas contaminants, antifreeze, etc. The cooling water discharge emission sensor 224 may also be able to detect the temperature of the cooling water flowing through the cooling water outlet 120 to determine the amount of waste heat discharged from the vessel. The power plant monitoring system 222 may also include a flow sensor 226 for determining the quantity of cooling water discharged through the cooling water outlet 120. The flow sensor 226 may determine the amount of flow by directly measuring the flow through the cooling water outlet 120, or may estimate the flow through the cooling water outlet 120 by measuring other parameters, such as pump RPM, pump current draw, pressure differentials across a pump, piping head losses, static head, etc. The cooling water discharge emission sensor 224 and the flow sensor 226 are able to send the sensed data to the emission management system processor 220 for processing and recording by the data storage system 210.

The cooling water monitoring system 223 may also include a treatment device 121 for treating the cooling water to remove or reduce the concentration of one or more contaminants in the cooling water. The cooling water monitoring system 223 may also include a treatment sensor 225 for monitoring the treatment device 121 and providing data to the emission management system processor 220 indicative of the operation of the treatment device 121. For instance, the treatment sensor 225 may monitor the treatment device 121 to determine if the treatment device 121 is in operation, if the treatment device 121 is properly working, to determine the type and/or level of treatment being performed by the treatment device 121, and send data relative to the sensed parameter to the emission management system processor 220 for processing and recording by the data storage system 210 (see FIG. 2).

The exhaust gas monitoring system 228 includes an exhaust gas emission sensor 230. The exhaust gas emission sensor 230 is able to detect a quantity and/or concentration of pollutants passing through the exhaust stack 124. For instance, the exhaust gas emission sensor 230 may be able to detect a concentration of potential contaminants in the exhaust gas, such as the presence of hydrocarbons from incompletely combusted fuel, aldehydes, acetic acids, nitric oxides, sulfur oxides, ozone, and/or VOCs. The exhaust gas monitoring system 228 may also include a flow sensor 232 for determining the quantity of exhaust gas discharged through the exhaust stack 124. The flow sensor 232 may determine the amount of flow by directly measuring the flow through the exhaust stack 124, or may estimate the flow through the exhaust stack by measuring other parameters, such as power plant RPM and throttle settings, pressure differentials across a restriction, etc. The exhaust gas emission sensor 230 and the flow sensor 232 are able to send the sensed data to the emission management system processor 220 for processing as will be described in more detail below.

The exhaust gas monitoring system 228 may also include a treatment device 123 for treating the exhaust gas to remove or reduce the concentration of one or more contaminants in the exhaust gas. The exhaust gas monitoring system 228 may also include a treatment sensor 231 for monitoring the treatment device 123 and providing data to the emission management system processor 220 indicative of the operation of the treatment device 123. For instance, the treatment sensor 231 may monitor the treatment device 123 to determine if the treatment device 123 is in operation, if the treatment device 123 is properly working, to determine the treatment type and level being performed by the treatment device 123, and send data indicative of these sensed parameters to the emission management system processor 220 for processing and recording by the data storage system 210 (see FIG. 2).

Figure 4:
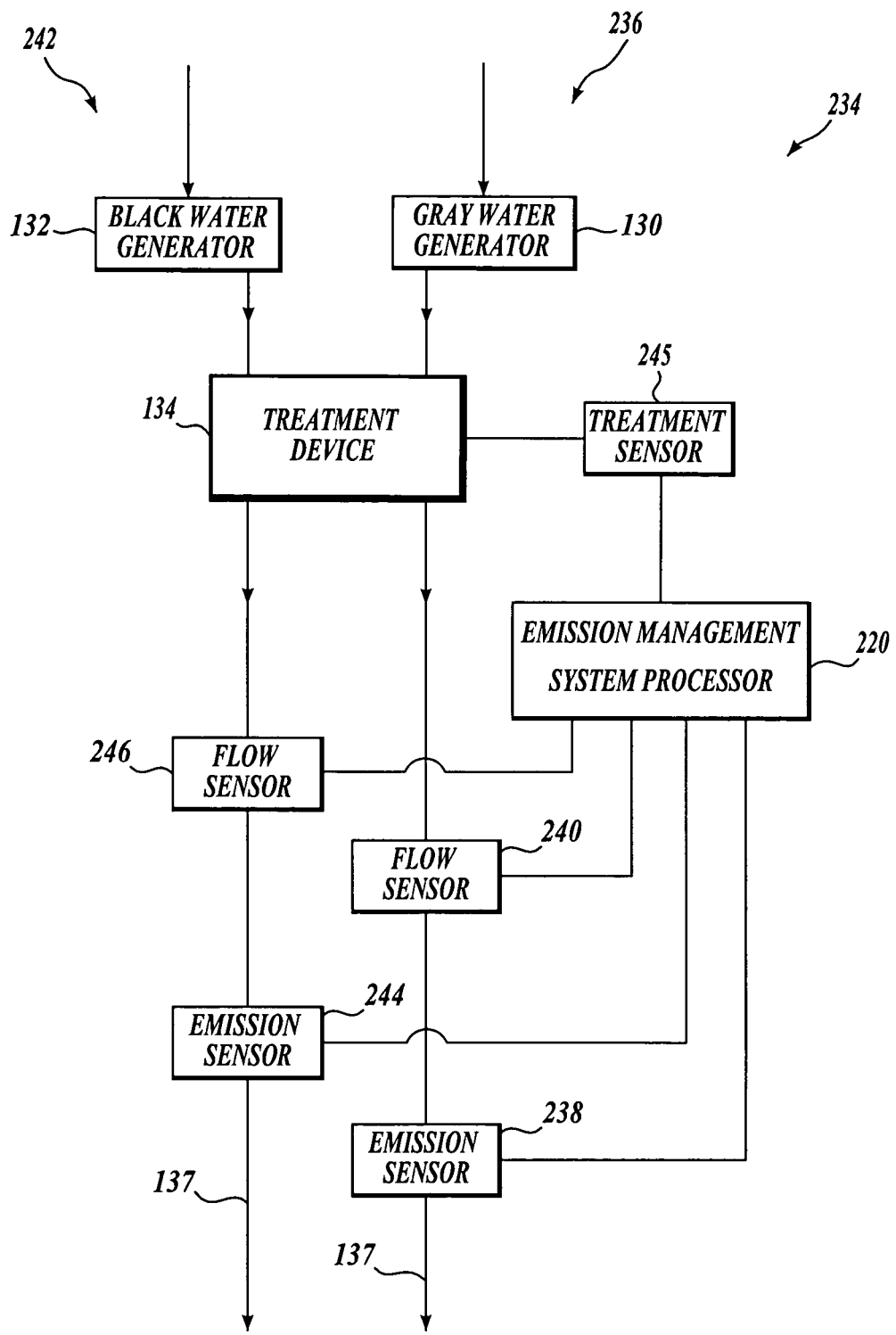
FIG. 4 is a schematic view of a portion of the emission monitoring assembly of FIG. 2 used to monitor emissions from the vessel's black water and gray water systems.

Referring to FIG. 4, the emission monitoring assembly includes a waste water monitoring system 234, which includes two subsystems, a gray water monitoring system 236 and a black water monitoring system 242. The gray water monitoring system 236 includes a gray water emission sensor 238. The gray water emission sensor 238 is able to detect a quantity and/or concentration of pollutants passing through the gray water discharge outlet 137. For instance, the gray water emission sensor 238 may be able to detect a concentration of potential contaminants in the gray water discharged from the gray water generators 130 and/or the treatment device 134, such as the concentration of e-coli bacteria, particulate concentration, biological oxygen demand, etc. The gray water monitoring system 236 may also include a flow sensor 240 for determining the quantity of gray water discharged through the gray water discharge outlet 137. The flow sensor 240 may determine the amount of flow by directly measuring the flow through the gray water discharge outlet 137, or may estimate the flow through the gray water discharge outlet 137 by measuring other parameters, such as pump RPM, pressure differentials across a pump, and/or calculating flow through well known fluid dynamic principles. The gray water emission sensor 238 and the flow sensor 240 are able to send the sensed data to the emission management system processor 220 for processing as will be described in more detail below.

The black water monitoring system 242 includes a black water emission sensor 244. The black water emission sensor 244 is able to detect a quantity and/or concentration of pollutants passing through the black water discharge outlet 137. For instance, the black water emission sensor 244 may be able to detect a concentration of potential contaminants in the black water discharged from the black water generators 132 and/or the treatment device 134, such as the concentration of e-coli bacteria, particulate concentration, biological oxygen demand, etc. The black water monitoring system 242 may also include a flow sensor 246 for determining the quantity of black water discharged through the black water discharge outlet 137. The flow sensor 246 may determine the amount of flow by directly measuring the flow through the black water discharge outlet 137, or may estimate the flow through the black water discharge outlet 137 via calculating flow using well known fluid dynamics principles and/or by measuring other parameters, such as pump RPM, pressure differentials across a pump, etc. The black water emission sensor 244 and the flow sensor 246 are able to send the sensed data to the emission management system processor 220 for processing as will be described in more detail below.

The waste water monitoring system 234 may also include a treatment sensor 245 for monitoring the treatment device 134 and providing data to the emission management system processor 220 indicative of the operation of the treatment device 134. For instance, the treatment sensor 245 may monitor the treatment device 134 to determine if the treatment device 134 is in operation, if the treatment device 134 is properly working, to determine the treatment type and/or level being performed by the treatment device 134, and send data to the emission management system processor 220 for processing and recording by the data storage system 210 (see FIG. 2).

Figure 5:
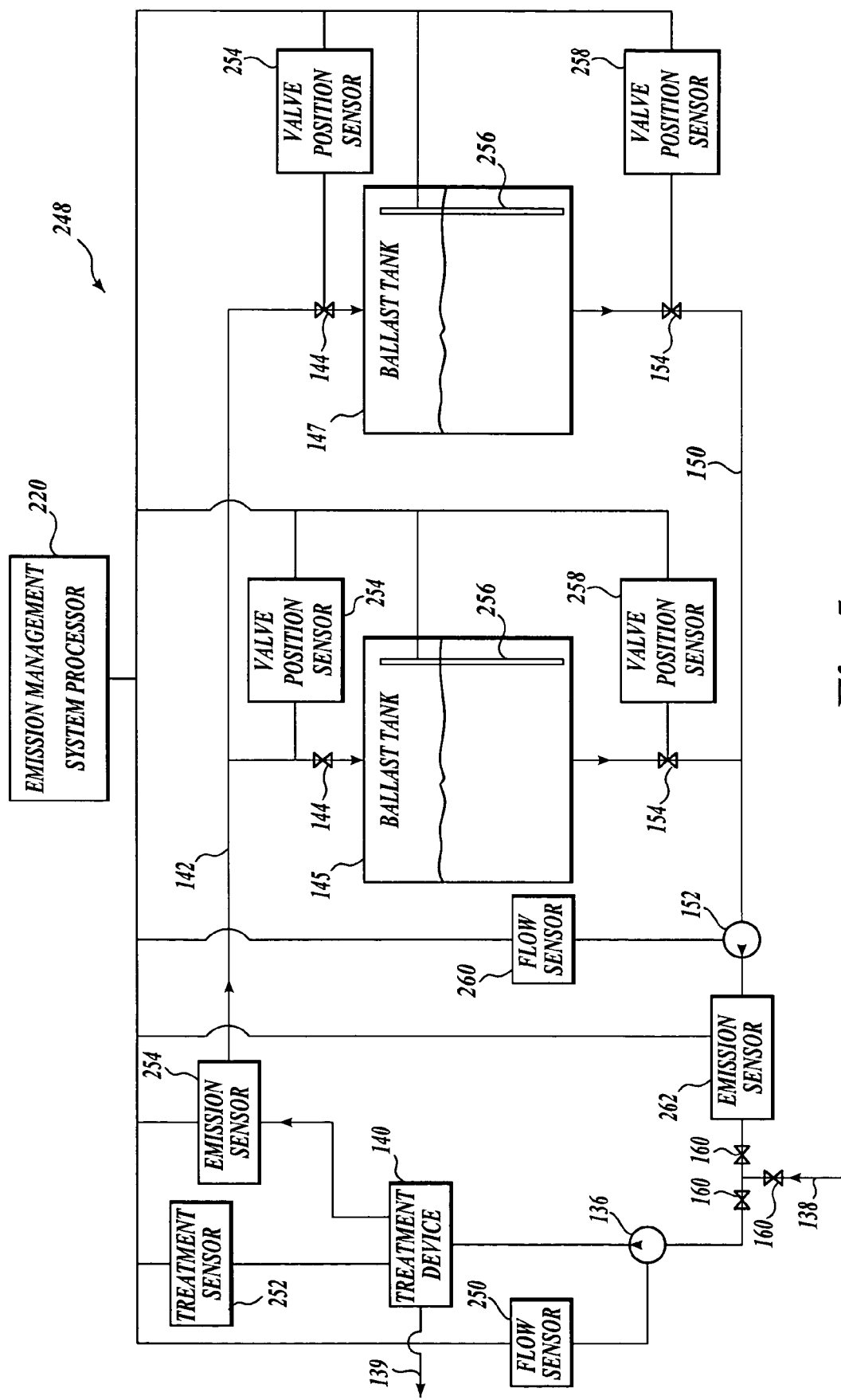
FIG. 5 is a schematic view of a portion of the emission monitoring assembly of FIG. 2 used to monitor emissions from the vessel's ballast water system.

Referring to FIG. 5, the emission monitoring assembly includes a ballast water monitoring system 248 for monitoring the transfer of ballast water into, out of, and between ballast tanks 145 and 147. The ballast water monitoring system 248 includes a flow sensor 250, which in the illustrated embodiment, monitors the ballast water transfer pump 136 to determine the amount of flow of ballast water transferred by the pump 136, such as by measuring the RPM of the pump, the amperage used in driving the pump, the head loss across the pump, etc. Preferably, the emission management system processor 220 receives the data from the flow sensor 250 regarding the pump 136, and uses data obtained from other sensors, such as the valve position sensors 254, the tank level sensors 256, a sensor (not shown) for measuring a sea height relative to the vessel or some other datum point, etc. This data is analyzed by the emission management system processor 220, which determines, using well known fluid dynamics principles, the disposition of any ballast water transferred into, out of, or between tanks of the vessel.

The ballast water then may enter an optional treatment device 140 for treating the ballast water to remove contaminants, for instance, to kill any organisms present in the ballast water. A treatment sensor 252 may be used to monitor whether the treatment device 140 is operating or not, is operating within specifications or not, or to determine the type and/or level of treatment being performed by the treatment device 140, and send data to the emission management system processor 220 for processing and recording by the data storage system 210 (see FIG. 2).

An emission sensor 254 may be placed downstream of the treatment device 140 to monitor the quality of effluent from the treatment device 140, i.e., to ensure that the ballast water has been properly treated, or if not properly treated, the concentration/quantity of contaminants in the ballast water. However, generally it is assumed that if the treatment device 140 is operating properly, the effluent is treated to a predetermined level specified by the manufacture of the treatment device 252 and is reported as being as treated as such, and therefore the emission sensor 254 may be considered redundant and may be eliminated from the system.

The ballast water transfer piping system 142 directs the ballast water to one or more of the ballast tanks 145 and 147. Which ballast tank 145 or 147 receives the ballast water is determined by the position of the inlet valves 144 of the ballast water transfer piping system 142. A series of valve position sensors 254 monitor and report the position of the inlet valves 144 to the emission management system processor 220. A series of water level sensors 256 monitor and report to the emission management system processor 220 the level of ballast water in each of the tanks 145 and 147. A series of outlet valve sensors 258 monitor and report to the emission management system processor 220 the position of a series of ballast tank outlet valves 154. The outlet valves 154 control the flow of ballast water from the ballast tanks 145 and 147 into the ballast water transfer system 150.

Once in the ballast water transfer system 150, the ballast water is driven by the pump 152 or by gravity to a series of control valves 160, which direct the ballast water overboard through an inlet/discharge line 138 or to the ballast water transfer pump 136 for transfer to a different ballast tank or overboard after treatment through discharge line 139. A flow sensor 260 determines the rate of ballast water flow through the ballast water transfer discharge system 150, either by measuring pump operational parameters, or by directly measuring the flow through the pipe(s) of the water transfer discharge system 150. An emission sensor 262 may be used to determine the quality of the effluent being discharged from the ballast tanks 145 and 147 and report same to the emission management system processor 220.

The ballast water monitoring system 248 may also include a treatment sensor 252 for monitoring the treatment device 140 and providing data to the emission management system processor 220 indicative of the operation of the treatment device 140. For instance, the treatment sensor 252 may monitor the treatment device 140 to determine if the treatment device 140 is in operation, if the treatment device 140 is properly working, to determine the treatment type and/or level being performed by the treatment device 140, and send data to the emission management system processor 220 for processing and recording by the data storage system 210 (see FIG. 2).

Although the inlet valves 144 and outlet valves 154 are shown as separate valves in the illustrated and described embodiment, it should be apparent to those skilled in the art that the piping of the ballast water system may be arranged such that one valve may be used as both an inlet and an outlet valve.

Figure 6:
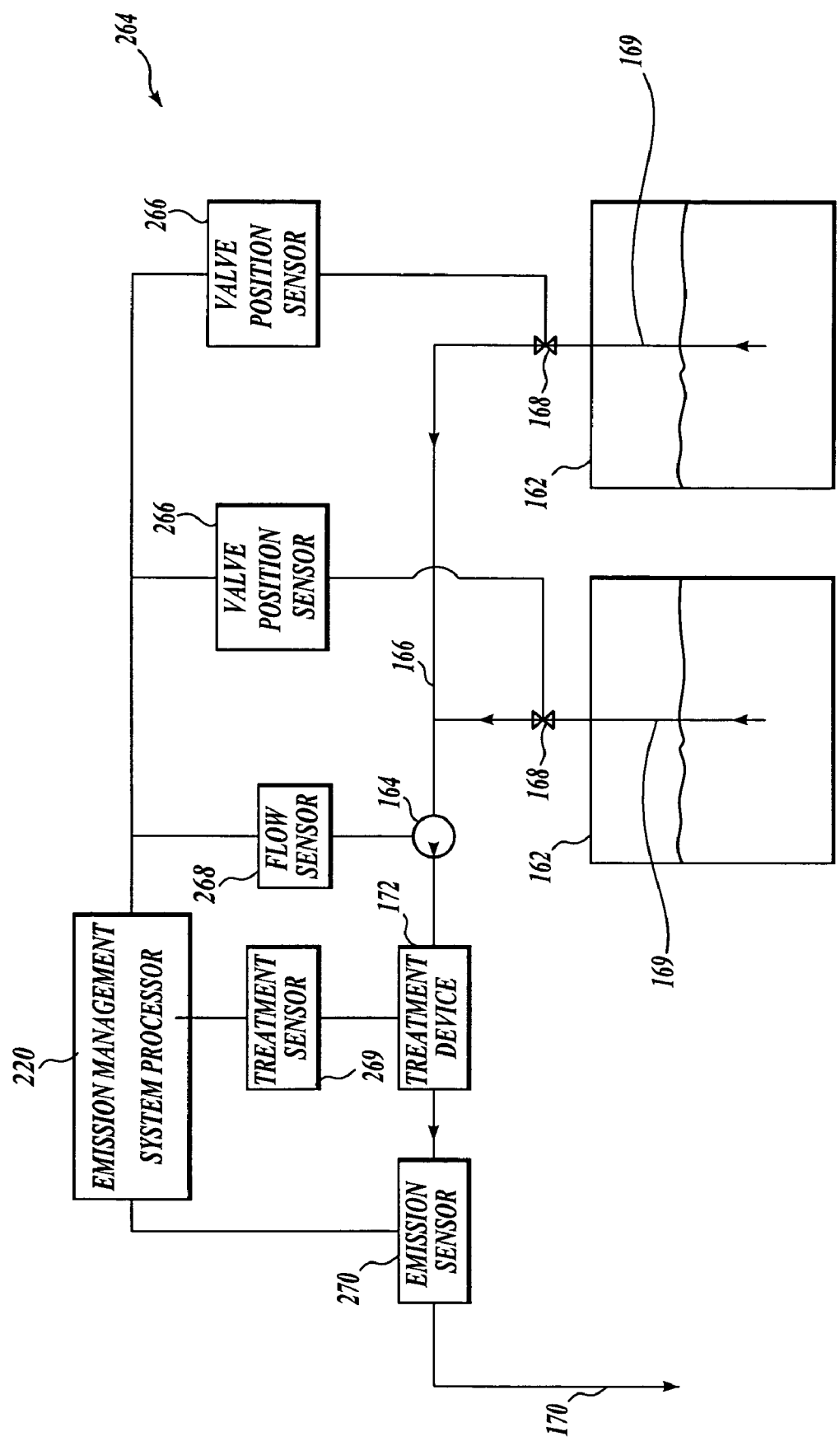
FIG. 6 is a schematic view of a portion of the emission monitoring assembly of FIG. 2 for monitoring emissions from a compartment liquid removal system of the vessel.

Turning to FIG. 6, the emission monitoring assembly includes a compartment liquid removal monitoring system 264. The compartment liquid removal monitoring assembly 264 includes one or more valve position sensors 266 for determining the position of one or more valves 168 for controlling flow through tank risers 169 disposed in the compartments 162. A flow sensor 268 monitors the operational parameters of the pump 164 or measures flow directly, and/or calculates flow using well known fluid dynamics principles to aid in determining the amount of flow through the removal piping system 166. An emission sensor 270 measures the quality of the liquids discharged through the compartment liquid removal system outlet 170.

The liquid removal monitor system 264 may also include a treatment device 172 for treating the liquid removed from the compartment 162 to remove or reduce the concentration of one or more contaminants in the removed liquid. The liquid removal monitor system 264 may also include a treatment sensor 269 for monitoring the treatment device 172 and providing data to the emission management system processor 220 indicative of the operation of the treatment device 172. For instance, the treatment sensor 269 may monitor the treatment device 172 to determine if the treatment device 172 is in operation, if the treatment device 172 is properly working, to determine the treatment type and/or level being performed by the treatment device 172, and send data to the emission management system processor 220 for processing and recording by the data storage system 210 (see FIG. 2).

Figure 7:
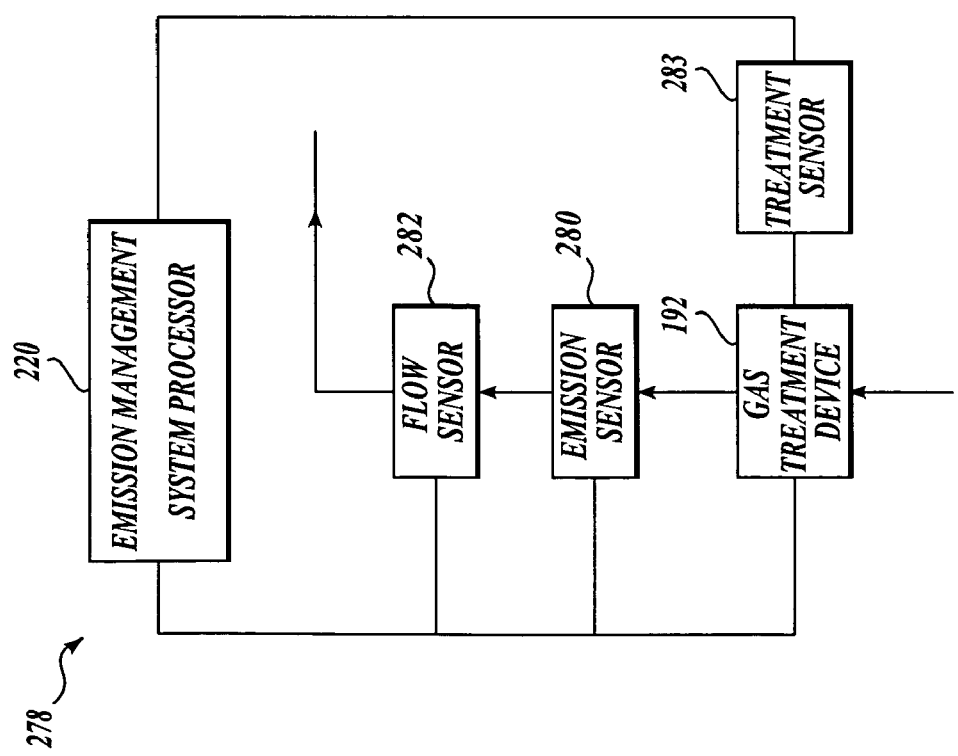
FIG. 7 is a schematic view of a portion of the emission monitoring assembly of FIG. 2 for monitoring emissions from a gas treatment device of the vessel.

Referring to FIG. 7, the emission monitoring assembly 202 (see FIG. 2) includes a gas treatment monitoring system 278. The gas treatment monitoring system 278 includes an air discharge emission sensor 280. The air discharge emission sensor 280 is able to detect a quantity and/or concentration of pollutants present in an exhaust stream emitted from the gas treatment device 192. For instance, the air discharge emission sensor 280 may be able to detect a concentration of VOCs or hydrogen sulfides emitted from the gas treatment device 192. The gas treatment monitoring system 278 may also include a flow sensor 282 for determining the quantity of flue gas discharged from the gas treatment device 192. The flow sensor 282 may determine the amount of flow by directly measuring the flow through an exhaust stack, or may estimate the flow through the exhaust stack by measuring other parameters, such the operating parameters of the gas treatment device 192 and/or calculating the flow using well known fluid dynamics principles. The air emission discharge emission sensor 280 and the flow sensor 282 are able to send the sensed data to the emission management system processor 220 for processing and recording by the data storage system (see FIG. 2).

The gas treatment monitoring system 278 may also include a treatment sensor 283 for monitoring the gas treatment device 192 and providing data to the emission management system processor 220 indicative of the operation of the gas treatment device 192. For instance, the treatment sensor 283 may monitor the treatment device 192 to determine if the treatment device 192 is in operation or not, if the treatment device 192 is properly working or not, to determine the type or level of treatment being performed by the treatment device 192, and send data relative to the sensed parameter to the emission management system processor 220 for processing and recording by the data storage system 210 (see FIG. 2).

Figure 8:
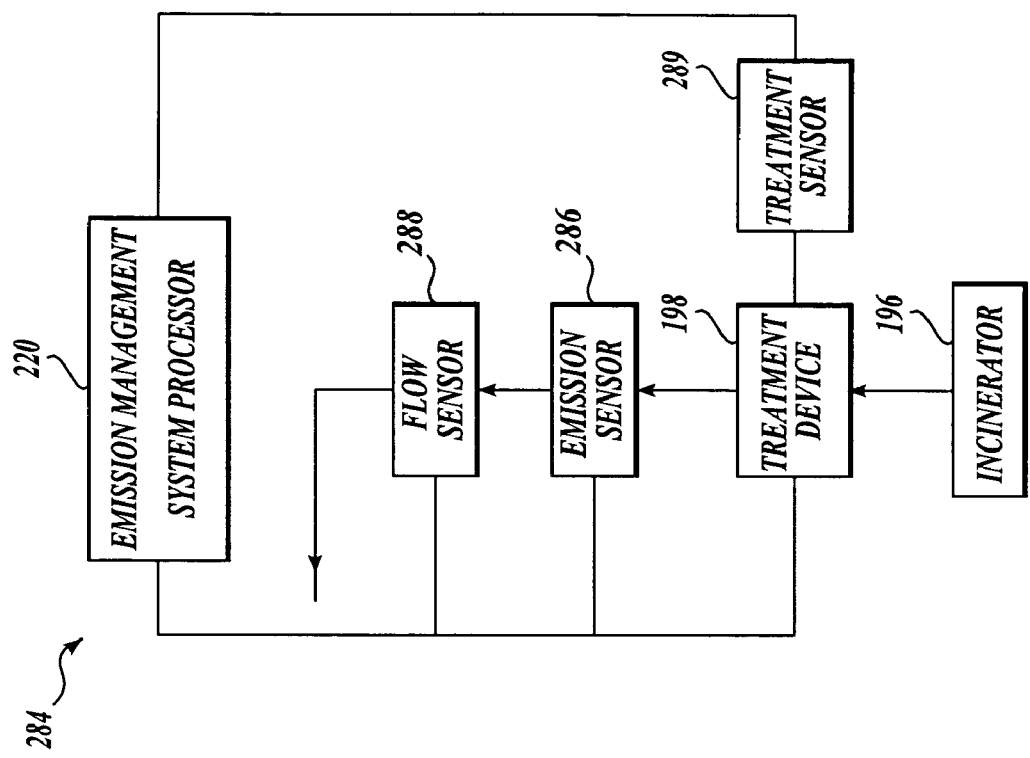
FIG. 8 is a schematic view of a portion of the emission monitoring assembly of FIG. 2 for monitoring emissions from an incinerator of the vessel.

Referring to FIG. 8, the emission monitoring assembly 202 (see FIG. 2) includes an incinerator monitoring system 284. The incinerator monitoring system 284 includes an air discharge emission sensor 286. The air discharge emission sensor 286 is able to detect a quantity and/or concentration of pollutants passing past the air discharge emission sensor 286. For instance, the air discharge emission sensor 286 may be able to detect a concentration of potential contaminants in a stream of flue gas emitted from the incinerator 196, such as the presence of particulates, the opacity of the flue gas, hydrocarbons from incinerated waste oil, etc. The incinerator monitoring system 284 may also include a flow sensor 288 for determining the quantity of flue gas discharged from the incinerator 196. The flow sensor 288 may determine the amount of flow by directly measuring the flow through an exhaust stack, or may estimate the flow through the exhaust stack by measuring other parameters, such the operating parameters of the incinerator 196 and/or calculating flow using well known fluid dynamics principles. The air discharge emission sensor 286 and the flow sensor 288 are able to send the sensed data to the emission management system processor 220 for processing and recording by the data storage system 210 (FIG. 2).

The incinerator 196 may also include a treatment device 198 for treating the flue gas emitted from the incinerator 196 to remove or reduce the concentration of one or more contaminants in the flue gas, although in most cases, the incinerator 196 is considered a treatment device itself and no further treatment of the flue gas is required. The incinerator monitoring system 284 may also include a treatment sensor 289 for monitoring the treatment device 198 and/or the incinerator 196 and providing data to the emission management system processor 220 indicative of the operation of the treatment device 198 and/or the incinerator 196. For instance, the treatment sensor 289 may monitor the treatment device 198 and/or the incinerator to determine if the treatment device 198 and/or the incinerator 196 is in operation or not, if the treatment device 198 and/or incinerator 196 is properly working or not, to determine the type or level of treatment being performed by the treatment device 198 and/or the incinerator 196, and send data relative to the sensed parameter to the emission management system processor 220 for processing and recording by the data storage system 210 (see FIG. 2).

Referring to FIG. 2, the vessel position assembly 204 includes a position sensor 272 adapted to determine the position of the vessel relative to the earth. Any suitable position sensors 272 utilizing any number of methods of determining the position of the vessel are within the spirit and scope of the present invention, a few suitable examples being satellite navigation systems, such as Global Positioning Systems, accelerometer based systems, dead reckoning systems, systems requiring the user to manually input the location of the vessel, etc. The vessel position assembly 204 is adapted to transfer the determined location of the vessel to the emission management system processor 220 for processing and recording.

The regulation compliance system 208 is adapted to compare proposed or completed emissions to determine compliance with the laws and regulations of the various jurisdictions in which the emission occurred or may occur. The regulation compliance systems 208 obtains the vessel position from the vessel position assembly 204 and/or user interface 214 and searches a law and regulation database 274 using the vessel position to determine the law and regulations applicable at the reported vessel position. The laws and regulations are sent by the regulation compliance system 208 to the emission management system processor 220 for processing and/or reporting to the user. The emission management system processor 220 may then determine if the proposed or actual emission will comply or complied with the applicable laws and regulations of the jurisdiction in which the emission will or has occurred. As should be apparent to those skilled in the art, the law and regulation database 274 may take many different forms, one suitable example being a well known Geographic Information System (GIS) module containing the applicable laws and regulations governing emissions in the jurisdictions of the routes of the vessel.

The data storage system 210 is coupled to the emission management system processor 220 and is able to store data generated by the emission management system 200 for later retrieval. For instance, the data storage system 210 is adapted to archive emission data, such as data representative of the time, quantity, contaminant concentration, treatment performed, duration, whether or not the emission complied with applicable laws and regulations, location of the emission, information descriptive of the vessel, etc.

The form generator system 212 is coupled to the emission management system processor 220 and is able to generate forms for reporting vessel emissions to various regulatory bodies or other interested parties. The form generator system 212 is preferably able to automatically obtain emission data from the data storage system 210 and populate various reporting forms with the emission data and other applicable data for submittal to the regulator body or interested party either automatically, such as automatically upon entering, leaving, or docking in a jurisdiction by wireless means, or printed for submittal. A few examples of forms able to be generated by the form generator system 212 are the California Ballast Water log, U.S. Coast Guard ballast water reports, International Maritime Organisation (IMO) logs and/or reports, for instance IMO ballast water, garbage, and oil logs and/or reports, discharge planning reports, violations log, manual readings log, current tank status report, tank ballast water sources report, and/or archive reports.

The user interface 214 is a graphical representation of the activities associated with the emission management system 200. The user interface includes a main screen that gives a visual representation of the emission management system 200. The user interface 214 also can be used for discharge planning, manual data entry, and reporting. For instance, the user interface 214 may be adapted to receive uptake or discharge location data from a user indicating a location of an actual or proposed uptake or discharge of an emission and emission data describing the emission.

Preferably, the user interface 214 provides an online description of the applicable jurisdictions and regulation in a graphical and easy to read format. The system also allows a user to access information stored upon the data storage system 210, for instance to provide the user with the ability to review previous emissions. The user interface 214 is also adapted to display various error messages and warnings.

The user interface 214 also permits a user to enter a proposed emission in a proposed jurisdiction to determine if such an emission will violate application laws and regulations. The emission management system processor 220 will then review the proposed emission and proposed location of the proposed emission with regard to the laws and regulations of the applicable jurisdictions and display upon the user interface 214 if the proposed emission would violate the laws and regulations of the applicable jurisdiction.

The user interface 214 may also display icons of the various systems of the ship which are emission generators. The user interface 214 may indicate which systems whose emission discharge would be in compliance with applicable laws and regulations, which systems whose emission discharge would not be in compliance with applicable laws and regulations, and which systems whose emission discharge is currently violating applicable laws and regulations. For instance, in one working embodiment of the present invention, ballast tanks having ballast water that may be discharged at the current location of the vessel are shown in green, the ballast tanks having ballast water whose discharge would violate applicable laws and regulations is shown in amber, and ballast tanks whose current discharge violates applicable laws and regulations of the jurisdictions currently governing the vessel operations are shown in red.

The data transfer system 216 is coupled to the emission management system processor 220 and is able to transfer data obtained and/or maintained by the emission management system 200 externally of the emission management system 200. Preferably, the data transfer system 216 is able to transfer the data externally of the emission management system 200 by wireless means to external systems, and preferably, automatically at certain times or locations, such as daily, weekly, or upon entering, leaving, or docking within a jurisdiction. The data transfer system 216 may also be able to connect to systems external of the emission management system 200, by wireless or hardwire means, for the transfer of data stored within the emission management system 200, such as for archiving purposes, reporting purposes, vessel management purposes, etc.

The tamper prevention system 218 is also coupled to the emission management system processor 220. The tamper prevention system 218 is able to monitor the emission management system 200 for tampering and or fraud. The tamper prevention system 218 includes physical barriers to tampering, such as locks and other components preventing physical tampering, and also electronic monitoring, such as through sensors, of the emission management system 200 to determine tampering of the emission management system 200. The tamper prevention system 218 is able to report tampering or potential tampering of the emission management system 200. The tamper prevention system 218 further includes backup power supplies, such as battery power supplies, for some or all of the components of the emission management system 200 to prevent loss of data and to ensure continuing monitoring of the vessel's systems. The tamper prevention system 218 is also adapted to report lost signal and lost power events to the emission management system processor 220 for storing, reporting, and/or action.

The timing sensor 221 is able to determine the timing of events occurring within the emission management system 200. More specifically, the timing sensor 221 is interfaced with the emission management system processor 220 and is able to provide the emission management system processor 220 with time data whenever needed by the emission management system processor 220. The time data provided by the timing sensor 221 is subsequently recorded by the data storage system 210 such that the time of occurrence of events, such as the uptake, transfer, or discharge of an emission from the vessel, is recorded and accessible for use at any time.

The emission management system processor 220 includes a processor and related software for managing the operation of the emission management system 200. The emission management system 200 is preferably able to communicate with and/or control each of the components of the emission management system 200, such as the emission monitoring assembly 202, vessel position assembly 204, regulation compliance system 208, data storage system 210, form generator system 212, user interface 214, data transfer system 216, tamper prevention system 218, and/or timing sensor 221.

Turning to FIG. 2, in light of the above description of the components of the emission management system 200, the operation of the emission management system 200 will be described in further detail. During operation, the emission monitoring assembly 202 uses an array of sensors, a few suitable examples being flow, emission, and treatment sensors, in coordination with the timing sensor 221, to determine the occurrence of emissions from the vessel, to quantify the emissions from the vessel, to determine if the emissions were treated, and to determine the timing of the emissions. Information gathered by the sensors is sent to the emission management system processor 220 for processing and recording by the data storage system 210.

When the emission management system processor 220 senses an uptake or discharge of an emission has occurred or is occurring, the emission management system processor 220 interacts with the vessel position assembly 204 to determine the location of the vessel when the emission uptake or discharge occurred or is occurring. Once the emission management system processor 220 has received data defining the emission and the location of the emission, the emission management system processor 220 interacts with the regulation compliance system 208 to determine if the emission violates the rules promulgated by the applicable jurisdictions.

The data storage system 210 interfaces with the emission management system processor 220 to record data received during operation from the various components of the emission management system 200, such as the vessel position assembly 204, the regulation compliance system 208, the data storage system 210, the form generator system 212, the user interface 214, data transfer system 216, and the tamper prevention system 218. The form generator 212 is adapted to process the data received by the emission management system processor 220 from the other components of the emission management system 200 for preparing forms for reporting, logging, archiving, etc., the data received by the emission management system processor 220. The user interface 214 displays data to a user and receives data input by the user during operation of the emission management system 200. The data transfer system 216 is able to transfer data received by the emission management system processor 220 from the various components of the emission management system 200 to a device located remotely of the vessel for use and/or storage. The tamper prevention system 218 monitors the components of the emission management system 200 for tampering, and if tampering is found, reports tampering to the emission management system processor 220 for processing and storing by the data storage system 210.

In light of the above general description of the operation of the emission management system 200, an illustrative example of the emission management system 200 in use will now be described. Referring to FIGS. 2 and 5, the emission management system 200 will be described in operation relative to an uptake of a selected segment of ballast water and the later discharge of the selected segment of ballast water.

Upon uptake of a selected segment of ballast water, flow sensor 250 detects the uptake of the selected segment of ballast water, and through measuring the operating parameters of the ballast pump 136, and through data obtained from other sensors, such as valve position sensors, tank level sensors, sea height sensors, and through calculations conducted by the emission management system processor 220 using well known fluid dynamic principles, determines that a specific quantity of ballast water, such as 1,000 gallons, was taken aboard. Data indicating the quantity of the ballast water taken aboard is relayed to the emission management system processor 220. The emission management system processor 220 interacts with the vessel position assembly 204 to determine the location of origin of the selected segment of ballast water taken aboard. The emission management system processor 220 also interacts with the timing sensor 221 to determine the time of the uptake of the selected segment of ballast water. Data indicating the quantity and time of the uptake of the selected segment of ballast water is stored by the data storage system 210.

The selected segment of ballast water passes through the treatment device 140. The treatment sensor 252 monitors the treatment device 140 and determines what treatment, if any, is performed upon the selected segment of ballast water. In the illustrated case, the treatment sensor 252 determines that the selected segment of ballast water has not been treated and relays this information to the emission management system processor 220, which stores this information via the data storage system 210. The emission sensor 254 analyzes the selected segment of ballast water discharged from the treatment device 140 and determines if the ballast water contains any contaminants and/or a quantity of contaminants contained within the ballast water. In the illustrated embodiment, the emission sensor 254 determines that the selected segment of ballast water contains viable organisms in a specific concentration and data indicating such is sent to the emission management system processor 220 for processing and storage via the data storage system 210.

The selected segment of ballast water is piped through the ballast water transfer piping system 142 and discharged into a ballast tank 145 or 147. The valve position sensors 254 sense that the tank valve 144 for ballast tank 145 is in an open position and that the tank valve 144 for the other ballast tank 147 is closed. This information is relayed to the emission management system processor 220 which determines that the selected segment of ballast water will be discharged into ballast tank 145 and records same via the data storage system 210. The ballast water level sensor 256 in the ballast tank 145 senses a rise in the tank level and relays this data to the emission management system processor 220 to verify the receipt of the selected segment of ballast water in tank 145. The data storage system 210 records the data received from the ballast water level sensor 256.

Upon discharge, the ballast water level sensor 256, valve position sensor 258 and flow sensor 260 monitor the passage of the selected segment of ballast water out of the ballast tank 145. The emission sensor 262 analyzes the selected segment of ballast water for contaminants. Depending on the arrangement of the valves 160, the selected segment of ballast water is directed to either discharge line 138 for discharge overboard without treatment or to the treatment device 140. The treatment device 140 may treat the selected segment of ballast water prior to discharge overboard via discharge line 139 or prior to discharge into ballast tank 145 or 147. Or the selected segment of ballast water may simply pass through the treatment device 140 without treatment if the selected segment of ballast water is simply being transferred to another ballast tank, such as ballast tank 147. The data storage system 210 records the disposition of the selected segment of ballast water and any treatment performed upon the ballast water.

Upon the emission management system processor 220 receiving data indicating that the selected segment of ballast water has been discharged, the emission management system processor 220 interfaces with the vessel position assembly 204 to determine the location of the vessel. The emission management system processor 220 then interacts with the regulation compliance system 208, and using the uptake location, the time period in which the selected segment of ballast water was stored aboard the vessel, the discharge location, and the treatment data recorded by the data storage system 210, determines if the discharge is in compliance with all applicable regulations, including whether the selected segment of ballast water was treated by a treatment device approved for the applicable jurisdiction of discharge, and displays this information on the user interface 214. This information, along with all of the other data relayed to the emission management system processor 220, is sent to the data storage system 210 for storage, transferred remotely of the vessel by the data transfer system 216, and presented on various forms via the form generator system 212. The tamper prevention system 218 monitors the various components of the emission management system 200 during the above described operation and relays any instances of tampering or potential tampering to the emission management system processor 220 for processing and recording by the data storage system 210.

Although the above illustrated example describes the emission being evaluated for compliance with applicable regulations based upon an actual uptake and/or discharge locations of the emissions from the vessel, it should be apparent to those skilled in the art that the emission management system may also be operated using proposed uptake and/or discharge locations. Operating the emission management system in this manner permits the emission management system to be used as a planning tool to permit the vessel to determine compliance before actual uptake and/or discharge of the emission occurs.

For instance, a user may manually enter a discharge location of an actual or proposed emission and enter emission data describing the emission, such as quantity, type, contaminant concentration, treatment data describing the treatment performed upon the emission or lack thereof, etc. The regulation compliance system may, upon receiving the discharge location, search the regulation database and locate the regulations of the various jurisdictions applicable to that discharge location. The emission management system processor can then, upon receiving the discharge location, the emission data, and the applicable regulations, determine if the emission was or will be in compliance with the applicable regulations. With regard to ballast water, the uptake location of the ballast water may also be entered by the user via the user interface so that the emission management system processor can use this information when determining if a proposed or actual discharge of the ballast at the discharge location will violate the applicable regulations.

Although the above illustrated example describes the monitoring of a single selected segment of ballast water for illustrative purposes, it should be apparent to those skilled in the art that the emission management system is able to simultaneously monitor and track the uptake, transfer, and discharge of multiple segments of ballast water or emissions simultaneously. For instance, the emission management system is able to track multiple segments of ballast water, such that at any given time, the emission management system is able to indicate different uptake locations, times, quantities, treatments performed, contaminant concentrations, etc., of a plurality of selected segments of ballast water disposed in a single or multiple tanks at any given time, and is able to evaluate each selected segment of ballast water contained in a tank for compliance upon discharge. Of note, since intermixing of the selected segments of ballast water contained in a tank occurs, one selected segment of ballast water contained in the tank may contaminate the others and prevent the discharge of the other selected segments of ballast water from being in compliance with applicable regulations.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An emission management system for managing emissions from a vessel adapted to travel on water, the emission management system comprising:
   (a) a user interface adapted to receive from a user a proposed uptake location, proposed emission data, a proposed discharge location, and an actual discharge location, and further adapted to receive actual emission data;
   (b) a regulation compliance system in communication with the user interface, the regulation compliance system adapted to receive the actual or proposed discharge location from the user interface and generate regulation compliance data indicating a set of regulations of the actual or proposed discharge location that govern the actual or proposed emission; and
   (c) an emission management system processor in communication with the user interface and regulation compliance system, the emission management system processor adapted to receive the discharge location, the actual emission data, and the regulation compliance data and determine if the actual emission is in compliance with the set of regulations and further adapted to review the proposed emission data and proposed discharge location and determine if the proposed emission is in compliance with the regulations of the proposed discharge location.

2. The emission management system of claim 1, wherein the emission is ballast water, and wherein the user interface is adapted to receive uptake location data from a user indicating a location of an actual or proposed uptake of the ballast water, and wherein the emission management system is adapted to receive the uptake location data, the discharge location data, the emission data, and the regulation compliance data and determine if the emission is in compliance with the set of regulations.

3. The emission management system of claim 1, further comprising a form generator system coupled to the emission management system processor to generate forms for reporting emissions to a regulatory body.

4. The emission management system of claim 1, wherein the set of regulations pertains to a jurisdiction and the emission management system processor is in communication with a treatment device to receive data regarding the type and/or level of treatment and determine whether the emission was treated by a treatment device approved for the jurisdiction.

* * * * *

UNITED STATES PATENT AND TRADEMARK OFFICE
CERTIFICATE OF CORRECTION

PATENT NO. : 7,603,210 B2  Page 1 of 1
APPLICATION NO. : 11/042290
DATED : October 13, 2009
INVENTOR(S) : Reynolds et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Fifth Day of October, 2010

David J. Kappos
*Director of the United States Patent and Trademark Office*